United States Patent [19] [11] 3,957,952
Naber et al. [45] May 18, 1976

[54] HIGH CAPACITY SULFUR OXIDE-ACCEPTORS AND THEIR PREPARATION

[75] Inventors: Jaap E. Naber; John Ramsbotham, both of Amsterdam, Netherlands

[73] Assignee: Shell Oil Company, Houston, Tex.

[22] Filed: Feb. 14, 1974

[21] Appl. No.: 442,973

[30] Foreign Application Priority Data
Mar. 19, 1973 United Kingdom............... 13115/73

[52] U.S. Cl................................. 423/244; 252/190
[51] Int. Cl.² ....................... C01B 17/00; B01J 8/00
[58] Field of Search ........................... 423/242–244; 252/190

[56] References Cited
UNITED STATES PATENTS

| | | |
|---|---|---|
| 2,992,884 | 7/1961 | Bienstock et al. .................. 423/244 |
| 3,501,897 | 3/1970 | van Holden et al. ............... 423/244 |
| 3,776,854 | 12/1973 | Dautzenberg et al............... 423/244 |

*Primary Examiner*—Oscar R. Vertiz
*Assistant Examiner*—Gregory A. Heller

[57] ABSTRACT

When copper-containing acceptors for removal of sulfur oxides out of waste gases are being prepared by impregnating an alumina-containing carrier which has been calcined at a temperature above 780°C with a solution containing cations of one or more of the metals aluminum, magnesium, titanium and/or zirconium either prior to or simultaneously with the impregnation with a solution containing copper cations, the capacity of the acceptor for sulfur oxides can be substantially increased by impregnating the carrier with a solution containing cations of one or more alkali metals either subsequent to or simultaneously with the impregnation employing the solution containing aluminum, magnesium, titanium and/or zirconium cations.

10 Claims, No Drawings

3,957,952

HIGH CAPACITY SULFUR OXIDE-ACCEPTORS AND THEIR PREPARATION

BACKGROUND OF THE INVENTION

The invention relates to solid acceptors suitable for removal of sulfur oxides from gases containing the same and to a process for their preparation. More particularly the invention relates to copper-containing solid acceptors for sulfur oxides which combine the desirable properties of superior stability and activity with a very high capacity for removal of sulfur oxides out of waste gas streams containing the same, their preparation and use in sulfur oxide removal processes.

By the term "acceptor" as herein employed is meant a solid substance which is capable of binding a gas or a gaseous compound either physically or chemically. Such acceptors may comprise a carrier on which one or more metals and/or metal compounds have been deposited. For example, copper and/or copper oxide supported on alumina is very suitable for the removal of sulfur oxides from gases under oxidative conditions. The sulfur oxides— including both sulfur dioxide and sulfur trioxide— are bound by the acceptor as sulfate, thus freeing the gases from sulfur oxides thereby permitting its discharge into the atmosphere without giving rise to air pollution. The loaded acceptor can subsequently be regenerated with a reducing gas which produces a regeneration waste gas rich in sulfur dioxide. This sulfur dioxide-rich gas can be used for the preparation of sulfuric acid or elemental sulfur. The regenerated acceptor is capable of binding fresh quantities of sulfur oxides under oxidative conditions.

According to U.S. Pat. No. 3,770,647 (common assignee) acceptors of the above-mentioned type can be prepared from carriers obtained by mixing aluminum hydroxide or alumina with a suitable binder such as clay, and forming the desired carrier bodies by drying and calcining the resultant mixture at temperatures above 780°C. The finished acceptor is then obtained by depositing on the carrier a metal capable of accepting sulfur oxides by impregnation with a solution of the metal compound. Acceptors prepared in this manner offer the advantage of having a very high physical and chemical stability. Such properties are highly desirable, particularly for acceptors which are subjected to the action of both reducing and oxidizing gases at high temperatures. However, a disadvantage of the finished catalysts prepared in this manner is that they generally show a lower activity than catalysts or acceptors based on alumina-containing carriers which have not been calcined at temperatures above 780°C.

U.S. Pat. No. 3,776,854 (common assignee) describes an improvement on the above-mentioned process for preparation of copper-containing acceptors wherein acceptors having a high initial activity in addition to a good chemical and physical stability are prepared by impregnating alumina-containing carriers, which have been calcined at a temperature above 780°C with a solution of a compound of magnesium, aluminum, titanium and/or zirconium prior to or simultaneously with their impregnation with a solution of a copper compound. However, despite the combination of desirable properties exhibited by acceptors prepared according to this process, they still are not considered optimum since their capacity for removal of sulfur oxides- i.e., quantity of sulfur oxides adsorbed per a given quantity of acceptor- falls somewhat short of the theoretical capacity for an equivalent quantity of active acceptor material.

SUMMARY OF THE INVENTION

It has now been found that when copper-containing acceptors for removal of sulfur oxides out of waste gases are being prepared by impregnating an alumina-containing carrier which has been calcined at a temperature above 780°C with a solution containing cations of one or more of the metals aluminum, magnesium, titanium and/or zirconium either prior to or simultaneously with the impregnation with a solution containing copper cations, the capacity of the acceptor for sulfur oxides can be substantially increased by impregnating the carrier with a solution containing cations of one or more alkali metals either out subsequent to or simultaneously with the impregnation employing the solution containing aluminum magnesium, titanium and/or zirconium cations. Accordingly one aspect of the instant invention is directed to a high capacity acceptor for sulfur oxides comprising an alumina-containing carrier which has been calcined at a temperature above 780°C prior to deposition thereon of:

a. one or more metals or metal compounds wherein the metal or metal cation is selected from the class consisting of aluminum, magnesium, titanium and zirconium;

b. copper metal or a compound containing copper cations or a mixture thereof and c. one or more alkali metals or metal compounds containing alkali metal cations; said metals described under a), b) and c) being deposited on the calcined carrier by impregnating said carrier with one or more solutions containing cations of said metals in a manner such that the carrier is impregnated with one or more metals described under a) either prior to or simultaneously with impregnation by the metals described under b) and c). Other aspects of the invention are directed to the process for preparation of these high capacity acceptors for sulfur oxides as has been hereinbefore described and their use in removing sulfur oxides from gas streams containing same.

DESCRIPTION OF THE PREFERRED EMBODIMENTS

In basic terms the copper-containing acceptors of the invention are prepared by impregnating an alumina-containing carrier which has been calcined at a temperature above 780°C with a. a solution containing cations of one or more of the metals aluminum, magnesium, titanium and zirconium;

b. a solution containing copper cations and c. a solution containing cations of one or more alkali metals, the impregnation with the solutions described under b) and c) being carried out subsequent to or simultaneously with the impregnation with the solution described under a).

It is preferred that the solutions which contain the above-mentioned metals and which are used to impregnate the alumina-containing carrier which has been calcined at a temperature above 780°C (also referred to as the alumina-containing carrier) are aqueous solutions, although solutions that comprise other solvents, such as methanol, ethanol, acetone and the like may also be used.

In principle any soluble compound of the above-mentioned metals can be used for impregnation. Preferably, the solutions will contain salts of the said metals, although other compounds containing cations of said metals, for example, aqueous solutions of hydroxides of one or more alkali metals, are by no means excluded.

Salts of both organic and inorganic acids of the metals can very suitably be used in the impregnation process according to the invention. Of this broad class of acid salts, the inorganic acid salts are preferred with the salts of nitric and sulfuric acids being most preferred, i.e., nitrates and sulfates. When metal salts in the form of a sulfate are employed it will be necessary, after drying of the impregnated acceptor, to subject the dryed acceptor to a reduction step prior to use in the sulfur oxide removal process of the invention. This reduction step which converts copper sulfate into metallic copper with the concomitant evolution of sulfur dioxide will be described in further detail below.

The sequence of impregnation of the alumina-containing carrier with the solution containing copper cations and the solution containing cations of one or more alkali metals can be chosen at will, provided that these impregnations are carried out simultaneously with or after the impregnation with a solution which contains cations of one or more of the metals aluminum, magnesium, titanium and zirconium. Preferably the alumina-containing carrier which has been calcined at a temperature above 780°C is impregnated with one solution which contains copper cations, cations of one or more alkali metals and cations of one or more of the metals aluminum, magnesium titanium and zirconium (so-called co-impregnation).

Although solutions containing any one of the cations of the alkali metals lithium, sodium, potassium, rubidium and cesium may be used, preference is given to the use of solutions containing sodium cations because they are readily available and lead to good results. Of the cations of the metals aluminum, magnesium, titanium and zirconium preference is given to aluminum cations because salts of aluminum are abundantly available and give rise to the formation of very active acceptors for sulfur oxides. The copper in the acceptor for sulfur oxides is generally used in an oxidized form deposited on the alumina-containing carrier.

In case co-impregnation is used for the depositing of the metals on the alumina-containing carrier both the "dry" and the "wet" impregnation technique may be used.

The alumina-containing carrier utilized in the invention preferably contains at least 30% by weight of alumina and may consist entirely of alumina, if desired. In addition to alumina, the carrier may contain other oxidic compounds, such as silica, magnesia, zirconia, thoria and the like.

The process according to the invention is particularly suitable for the preparation of acceptors based on alumina-containing carriers which have been calcined at a temperature between 800°C and 1800°C, and preferably between 850°C and 1300°C.

Alumina-containing carriers of the above-described type may be obtained by mixing an alumina, a hydrated alumina and/or aluminum hydroxide with one or more ceramic binders, possibly with the addition of a pore-forming agent and/or a lubricant, by forming the mixture into shaped articles and calcining the said shaped articles at a temperature above 780°C.

The mixture of alumina, hydrated alumina and/or aluminum hydroxide and ceramic binder can be readily shaped into any desired form such as pellets, tablets, extrudates, rings or ceramic castings, for example tiles.

The ceramic binder used may be clays such as kaolin, kaolinite, attapulgite, halloysite, montmorillonite, bentonite and/or sepiolite. The properties and mechanical strength of the finished carrier can be influenced and varied, depending on the type of clay used, as is known by those skilled in the art. Kaolin and/or bentonite are preferred because they are readily available in a pure state and can easily be reduced to the desired particle size.

The amount of ceramic binder used depends to some extent on the type of clay employed and can be readily determined in each particular case. Generally, 0.04 to 1, and more preferably 0.1 to 0.5 parts by weight of clay are used per part by weight of alumina.

The carrier bodies obtained in this manner are already slightly porous. However, the porosity can be considerably increased by adding pore-forming agents to the starting material. Suitable agents are combustible substances such as flour, sugar, sawdust, resins, waxes and the like. Highly suitable pore-forming agents are polypivalolactone or polypropylene in particular. The pore-forming agent is preferably used in an amount of 1–25% by weight, and more preferably of 8–15% by weight, based on alumina and binder.

The lubricant used may be stearic acid, polyvinyl alcohol or an emulsion of a synthetic wax.

The mechanical strength of the alumina-containing carriers may be increased by adding a glass to the mixture of alumina and/or hydrated alumina with one or more ceramic binders. The glass to be used preferably has a melting point below the temperature at which the shaped articles are calcined.

The glass is generally employed in the form of glass powder, glass flour or glass frits and be added to the mixture additionally or to replace part of the ceramic binder. The glass is preferably added to the mixture in a quantity of less than 10% by weight (on a dry matter basis). Preferably, the glass is added in an amount of from 1 to 6% by weight. The glass used may be soda-lime glass, boron silicate glass and/or lead glass.

The starting material preferably used in the preparation of the alumina-containing carriers described above is alumina, in particular gamma-alumina.

Mixing of the alumina, hydrated alumina or aluminum hydroxide, and the ceramic binder and any other additives such as glass, lubricant and/or pore-forming agent may be effected in any manner known in the art, for example by mixing these materials in a finely divided state either dry or in the presence of water or any other wetting agent. Whatever mixing techniques employed, it is preferred that the mixture from which the shaped articles are formed should contain at least 60% by weight, and more preferably 70 to 85% by weight of moisture. After shaping, the shaped articles are usually first air-dried and/or dried at temperatures of approximately 100°–120°C before being calcined at a temperature above 780°C.

Very good acceptors according to this invention are obtained by impregnation of the alumina-containing carrier with a solution containing copper cations, cations of aluminum, magnesium, titanium and/or zirconium, and cations of one or more alkali metals, which solution contains the copper and one or more of the metals aluminum, magnesium, titanium and zirconium in an atomic ratio of from 1:0.5 to 1:5. More preferably, the copper is applied by co-impregnation with aluminum by means of an impregnating solution containing these metals in an atomic ratio of from 1:1 to

1:3.

For the use envisaged, the copper content of the copper-containing acceptors may vary within wide limits, depending on the specific surface area of the carrier material employed. This content is usually 1 to 15% by weight, based on the finished carrier. However, optimum results are obtained with acceptors containing 4 to 10% by weight of copper.

The alkali metal (in particular sodium) content of the acceptors may vary between wide limits. Amounts of from 1 to 30, in particular from 4 to 20% by weight, based on the finished carrier, i.e., prepared acceptor, are very suitable.

After the copper salt and the salts of the other metals specified have been deposited on the carrier, the latter may, after optional drying, be calcined again, namely at temperatures below 600°C, preferably from 350°C–550°C.

After drying and calcining the acceptor in most cases contains copper in an oxidic form, and can be used as such for the acceptance of sulfur oxides. In case sulfates are used during impregnation a reduction step is needed in order to bring the acceptors in a form suitable for accepting sulfur oxides. This reducing step very suitably is carried out with the aid of a free hydrogen-containing gas, as described below for the regeneration of an acceptor loaded with sulfur oxides. After reduction the copper deposited out of a copper sulfate impregnating solution is substantially in the metallic state and is now ready for the removal of sulfur oxides from waste gases under oxidative conditions.

Copper-containing acceptors have the great advantage that after being loaded with sulfur oxides, with the formation of metal sulfate, they can be regenerated at a temperature which is the same or substantially the same as that at which acceptance took place. Operating at acceptance and regeneration temperatures which differ only slightly is advantageous not only from the standpoint of heat economy, but is also of very great importance in respect to prolonging acceptor life. For a process to be economical it is essential for the acceptor used to be capable of being regenerated several thousand times without losing its stability and activity. Such a long life will not be easily achieved with acceptors which have to be heated and/or cooled over a relatively wide temperature range in each regeneration. The chemical and physical stability of the copper-containing acceptors can in fact be considerably impaired by temperature changes of this type.

The acceptors prepared according to the process of the present invention have a higher capacity for the acceptance of sulfur oxides than acceptors which contain the same amount of copper but no alkali metal compound. As a result of the great capacity for acceptance of sulfur oxides exhibited by the acceptors prepared according to the invention, a given amount of sulfur oxides can be removed from a gas stream with the aid of less acceptor than was heretofore necessary, which makes the application of smaller plants possible. If it is desired to use the same amount of the acceptor according to the invention as was heretofore necessary with prior acceptors, for the acceptance of the same amount of sulfur oxides, acceptance and regeneration may be carried out at a lower temperature than with prior acceptors which is a technical advantage.

The invention also relates to a process for the removal of sulfur oxides from sulfur oxide-containing gases by contacting said gases in the presence of oxygen with a copper-containing acceptor prepared as described above at temperatures of from 325°C to 475°C, and preferably of from 375°C to 430°C. After loading with sulfur oxides, the acceptor is regenerated with a reducing gas at temperatures which are in the same temperature range as the acceptance temperature. After regeneration, the acceptor is again contacted with the sulfur oxides-containing gas in the presence of oxygen.

Reducing gases suitable for use in regeneration include hydrogen or hydrogen- and/or carbon monoxide-containing gas mixtures. It is also possible to use light hydrocarbons or mixtures thereof, such as methane, ethane, propane, or technical mixtures such as natural gas or tops obtained in the straight distillation of petroleum. If desired, these reducing gases may be used, diluted with inert gases such as nitrogen and/or water vapor.

Upon regeneration of the copper sulfate-loaded acceptor, a sulfur dioxide-rich gas having a relatively high sulfur dioxide concentration is obtained. Consequently, the process according to the invention is very suitable for treating large quantities of gases or gas mixtures containing relatively low concentrations of sulfur oxides. The sulfur dioxide-rich gas may then be processed to elemental sulfur or sulfuric acid in accordance with known processes. If the process according to the invention is applied to Claus off-gases, the sulfur dioxide-rich regeneration gas can be recycled to the actual Claus process in a simple manner. For processing the gas to sulfuric acid it is advantageous to cool the gas obtained in the regeneration to such an extent that a condensate is formed and to strip the resultant condensate with steam in order to free sulfur dioxide, therefrom.

The invention will be further illustrated by the following examples.

EXAMPLE I

Alumina-containing carrier material was prepared as follows:

7065g of a commercially available spray-dried alumina powder containing 30.1% by weight of water were mixed with 1390g of kaolin powder, 565g of polypropylene powder, 140 g of soda-lime glass powder and 290g of Wyoming bentonite clay powder.

After mixing the ingredients for 15 minutes in a kneading machine, 11 liters of distilled water containing 5 ml sodium silicate solution (28.5% by weight $SiO_2$) and and 2 ml detergent ("TEEPOL") were added. The mixture was then kneaded for 1 hour and the resulting paste extruded to extrudates through an extrusion die having a 1.5 mm opening. The extrudates formed were dried in an oven at 120°C, calcined for 3 hours at 600°C, and finally for 2 hours at 1100°C. The resultant extrudates had a surface area of 99.5 $m^2/g$ and a pore volume of 0.37 ml/g, both measured with nitrogen by the B.E.T.- method.

The extrudates were impregnated in the dry state with an aqueous solution containing the nitrates of sodium, copper and aluminum. The salt concentrations were such that the final acceptor had a parts by weight formulation of 5 Cu/3 Na/3.3 Al/100 carrier after a calcination at 500°C for 3 hours. An acceptor not containing sodium was similarly made to a final parts by weight formula 5 Cu/3.3 Al/100 carrier.

The capacity for acceptance of $SO_2$ of the acceptors so obtained was determined in the following way:

A simulated stack gas (composition in % volume 6.0 $O_2$, 14.6 $CO_2$, 78.6 $N_2$, 0.3 $SO_2$) was passed with steam (steam/dry gas volume ratio of 0.06) at a space velocity of 8000 Nl of gas/l of acceptor/hr at 400°C over 10 ml of extrudates for a preset time. The cumulative slip of $SO_2$ as a percentage of the total amount of $SO_2$ passed over the acceptor was determined after that time. Then the acceptor was purged with nitrogen for 5 minutes and subsequently regenerated at 400°C with a reducing gas mixture comprising steam and hydrogen in a molar ratio of 4.0 at a space velocity of 250 Nl of wet gas/l acceptor/hour until all removable oxides of sulfur had been liberated. The acceptor was then flushed with nitrogen for 5 minutes at 400°C. Then a new acceptance cycle was started for another preset time of different length of the previous one and so on. From the results obtained, the number of moles of $SO_2$ accepted per atom copper in the acceptor in relation to the cumulative slip of $SO_2$ was calculated. The results are recorded in Table A.

TABLE A

| No. | Composition of acceptor (p.b.w.) | Moles of $SO_2$ accepted per atom Cu at a cumulative $SO_2$-slip of | | | | |
|---|---|---|---|---|---|---|
| | | 5% | 10% | 20% | 30% | 40% |
| 1 | 5 Cu/3.3 Al/100 carrier | 0.3 | 0.48 | 0.7 | 0.87 | 1.03 |
| 2 | 5 Cu/3.3 Al/3 Na/100 carrier | 0.57 | 1.0 | 1.52 | 1.80 | 2.05 |

The results show that the $SO_2$-acceptance capacity of acceptor 2 according to the invention is superior to that of acceptor 1 not according to the invention.

EXAMPLE II

Acceptors consisting of extrudates with a diameter of 1 mm were prepared in a way similar to that described in Example I. They were tested with the same synthetic stack gas as described in Example I, and the same regeneration procedure was used. The temperatures of acceptance and regeneration were varied from 350°C to 430°C, each regeneration cycle being carried out at substantially the same temperature as the preceding acceptance cycle. The number of moles $SO_2$ accepted per atom of copper was determined at 10% cumulative slip of $SO_2$. The results are recorded in Table B.

TABLE B

| No. | Composition of acceptor p.b.w. | Moles of $SO_2$ accepted per atom Cu at a cumulative $SO_2$-slip of 10% at a temperature (°C) of | | | | | | | | |
|---|---|---|---|---|---|---|---|---|---|---|
| | | 350 | 360 | 370 | 380 | 390 | 400 | 410 | 420 | 430 |
| 3 | 5 Cu/3.3 Al/100 carrier | — | — | 0.10 | 0.32 | 0.50 | 0.63 | 0.72 | 0.77 | 0.80 |
| 4 | 5 Cu/3 Na/3.3 Al/100 carrier | 0.2 | 0.44 | 0.69 | 0.94 | 1.17 | 1.4 | 1.65 | 1.83 | 2.0 |

From the results given in Table B, it is apparent that acceptor 4 (according to the invention) has a much higher capacity for $SO_2$-acceptance at a given temperature and at a given cumulative $SO_2$-slip than acceptor 3 (not according to the invention).

What is claimed is:

1. In a process for the preparation of a regenerable acceptor containing 1 to 15% by weight copper for removing sulfur oxides from gases containing the same, said acceptor being regenerable at substantially the same temperature range at which acceptance is effected, wherein a carrier containing at least 30% by weight alumina is calcined at a temperature above 780° and impregnated with a solution containing cations of one or more of the metals aluminum, magnesium, titanium and zirconium either prior to or simultaneously with the impregnation with a solution containing copper cations, said aluminum, magnesium, titanium and zirconium metals being present in solution at an atomic ratio of from 1:0.5 to 1:5 of the copper present in solution, the improvement which comprises impregnating said carrier with a solution containing cations of one or more alkali metals either subsequent to or simultaneously with the impregnation employing the solution containing aluminum magnesium, titanium and zirconium cations, said alkali metals being impregnated on the carrier in an amount of from 1 to 30% by weight of the prepared acceptor.

2. The process of claim 1 wherein the solutions containing the metal cations are aqueous solutions.

3. The process of claim 2 wherein the alumina-containing carrier is impregnated with one solution which contains copper cations, cations of one or more alkali metals and cations of one or more of the metals selected from the class consisting of aluminum, magnesium, titanium and zirconium.

4. The process of claim 1 wherein the alumina-containing carrier has been calcined at a temperature between 800°C to 1800°C.

5. The process of claim 1 wherein the atomic ratio of the copper cations to the aluminum, magnesium, titanium or zirconium cations is from 1:1 to 1:3.

6. The process of claim 1 wherein after the copper cations the alkali metal cations and the aluminum, titanium or zirconium cations have been impregnated in the alumina-containing carrier, the latter is calcined at a temperature between 350°C and 550°C.

7. A regenerable acceptor for $SO_2$ containing 1 to 15% by weight copper, which is regenerable at substantially the same temperature at which acceptance is effected, produced by calcining a carrier containing at least 30% by weight alumina at a temperature above 780°C and depositing thereon a. one or more metals or metal compounds wherein the metal or metal cation is selected from the class consisting of aluminum, magnesium, titanium and zirconium;

b. copper metal or a compound containing copper cations or a mixture thereof and c. one or more alkali metals or metal compounds containing alkali metal cations in an amount such that the alkali metal content of the prepared acceptor ranges from 1 to 30% by weight;

said metals described under a), b) and c) being deposited on the calcined carrier by impregnating said carrier with one or more solutions containing cations of said metals in an manner such that the atomic ratio of the metals in solution described under a) ranges from 1:0.5 to 1:5 of the metal in solution described under b) and the support is impregnated with one or more metals described under a) either prior to or simultaneously with impregnation by the metals described under b) and c).

8. The copper-containing acceptor of claim 7, wherein the alumina-containing carrier is produced by preparing a mixture containing 0.04 to 1 parts of a ceramic binder per part of alumina, (b) forming said mixture into a shaped article, (c) calcining said shaped article at a temperature between 800°C and 1800°C.

9. The copper-containing acceptor of claim 8, wherein the alumina-containing carrier is impregnated with one solution which contains copper cations, cations of one or more alkali metals and cations of one or more of the metals selected from the class consisting of aluminum, magnesium, titanium and zirconium.

10. A process for removing sulfur oxides from a sulfur oxide and oxygen-containing gas which comprises (a) contacting said gas with the copper-containing acceptor of claim 9 under oxidative conditions at a temperature between 350°C and 475°C, (b) regenerating the resultant loaded acceptor by terminating contact with the sulfur oxide and oxygen-containing gas and subsequently contacting the loaded acceptor with a reducing gas at a temperature within the same range as the acceptance temperature, and (c) returning the regenerated acceptor into contact with the sulfur oxide and oxygen-containing gas.

* * * * *